United States Patent [19]

Drago et al.

[11] Patent Number: 4,830,999

[45] Date of Patent: May 16, 1989

[54] ZEOLITE CONTAINING ENTRAPPED ANIONIC MATERIAL

[75] Inventors: Russell S. Drago, Gainesville, Fla.; Iwona Bresinska, Poznan, Poland

[73] Assignee: University of Florida, Gainesville, Fla.

[21] Appl. No.: 16,737

[22] Filed: Feb. 20, 1987

[51] Int. Cl.$^4$ .......................... B01J 29/10; B01J 29/20
[52] U.S. Cl. ........................ 502/74; 502/78; 502/79
[58] Field of Search ............... 502/74, 175, 77, 78

[56] References Cited

U.S. PATENT DOCUMENTS 3,472,788 10/1969 Erner ............................ 502/175
4,237,063 12/1980 Bell ............................. 502/175
4,347,164 8/1982 Scherzer ........................ 502/175

FOREIGN PATENT DOCUMENTS 2842901 4/1980 Fed. Rep. of Germany ...... 502/175
253122 4/1927 United Kingdom ............... 502/175

Primary Examiner—Carl F. Dees
Attorney, Agent, or Firm—Dennis P. Clarke

[57] ABSTRACT

A composition comprising a crystalline aluminosilicate zeolite having entrapped therein as an ion pair an anionic material having the formula $ML_n^{-n+m}$, wherein M is a metal, L is an anionic ligand, which coordinates more strongly to M than to the surface of said zeolite, n is the number of ligands bound to the metal ion and is an integer from 1 to 6, and m is the oxidation state of the metal.

18 Claims, No Drawings 4,830,999

ZEOLITE CONTAINING ENTRAPPED ANIONIC MATERIAL

BACKGROUND OF THE INVENTION

1. Field of the Invention

The present invention relates to a novel zeolite composition and a method for its preparation.

2. Prior Art

Crystalline inorganic aluminosilicate zeolites occur naturally in a wide variety of crystallographic forms and have been successfully synthesized. These zeolites have a common structure characterized by a substantially rigid three-dimensional network system composed of silicon, aluminum and oxygen atoms arranged such that the crystals possess interstitial channels communicating with cavities. These channels may also contain cations such as sodium and calcium ions.

A wide variety of different catalytic and other properties have been found to be associated with crystalline aluminosilicates. They have found wide application in catalysis, drying procedures, purification, etc. They have also been found to be useful for promoting the oxidation of various compositions.

The catalytic properties of zeolites can be altered by introducing into the interstitial channels and cavities thereof one or a variety of catalytically active compositions. The catalysts are introduced into the zeolite after crystal formation of the aluminosilicate or are incorporated in the zeolite structure during manufacture of the crystalline material.

Zeolites have been previously modified to contain positively charged and neutral metal complexes ($ML_n^{2+}$ and $ML_n$, wherein M is a metal ion, L is a neutral or charged ligand and n indicates the number of ligands bound to the metal ion). Because of the negative charges on the oxide surface and in the interstitial channels and cavities of the zeolite, it was thought to be impossible to incorporate anionic materials ($ML_n^{m-}$) wherein M, L and n are as described above and m− is the charge on the anionic ligand therein.

It is an object of the present invention to provide a new class of compositions comprising zeolite materials containing anionic complexes entrapped therein.

It is a further object of the present invention to provide a novel method for preparing the above-described zeolite composition containing entrapped anionic materials.

SUMMARY OF THE INVENTION

These and other objects are provided by the present invention, one embodiment of which is a composition consisting essentially of a crystalline aluminosilicate zeolite having a three-dimensional, porous network structure containing cavities inter-connected by interstitial channels, the structure having entrapped therein as an ion pair an anionic material having the formula, $ML_n^{(-n+m)}$, wherein M is a transition metal, L is an anionic ligand, n is the number of ligands bound to the metal ion and is an integer from 1 to 6, and m is the oxidation state of the metal.

A further embodiment of the invention is a method of preparing a crystalline aluminosilicate zeolite having a three-dimensional, porous network structure containing cavities inter-connected by interstitial channels, the structure having entrapped therein as ion pair an anionic material having the formula, $ML_n^{(-n+m)}$, wherein M is a metal, L is an anionic ligand, n is the number of ligands bound to the metal ion and is an integer from 1 to 6 and m is the oxidation state of the metal, comprising reacting a metal derivative of the zeolite in an aqueous solution with ions of the metal, M, whereby at least a portion of the metal ions of the metal derivative of the zeolite are exchanted for ions of the metal, M, and subsequently reacting the exchanged ions of metal, M, with the ligands whereby said $ML_n^{(-n+m)}$ is produced and entrapped within the network structure.

DETAILED DESCRIPTION OF THE INVENTION

Zeolites are conventionally classified according to the interatomic structure thereof. Zeolites of type, A, X or Y are suitable to the purposes of the present invention, however, it will be understood that any zeolite consisting of a 3-dimensional framework may be employed.

The pore, interstitial channel and cavity sizes of the zeolite will depend in each case on the ionic size of the anionic pair to be incorporated therein, but generally may lie in the range of from about 4 Å to about 30 Å, preferably from about 8 Å to about 18 Å. The preferred dimensions may be exceeded if the cation of the anionic material is contained in a different cavity, pore or interstitial channel than the anion but is sufficiently close thereto to form an ion-pair.

In addition to these size restrictions, the ligand, L, must be selected such that it coordinates more strongly to M than to the oxide surface of the zeolite. The known equilibrium constants of the various metal-ligand combinations [See, e.g., Christensen et al, Handbook of Metal-Ligand Heats (and Related Thermodynamic Quantities), Marcel Dekker (N.Y., N.Y., 1983)] may be employed to select those combinations which will maintain their integrity within the pores, cavities and interstitial channels of the zeolite.

Thus, when Co(II) is treated with cyanide in aqueous solution, $Co_2(CN)_{10}^{6-}$ forms thereby enabling, according to the present invention, the formation of monomeric cobalt complexes, with the general formula $Co(CN)_n^{-n+2}$ which are stabilized within the zeolite. The neutral and charged complexes, $Co(CN)_2$ and $Co(CN)^+$, respectively, may also be present along with the anionic complexes. By employing optimum reaction conditions, materials in which the principal species have compositions $ML_n^{-n+m}$, where n=1 to 5, may be prepared and entrapped within the zeolite structure. Infrared analyses on those samples in which the Co(II) to cyanide ratio is greatre than 2 indicate no free $CN^-$, thereby indicating that anionic (n>2 in $Co(CN)_n^{-n+2}$) species were prepared. It will be understood that the anions in the zeolite will be accompanied by or paired with cations ($C^+$ or $C^{2+}$) thereby neutralizing the negative charge of the anion. The catio may be any that binds, e.g., to the carbon end of the cyanide ion less strongly than does M. The cation $C^+$ or $C^{2+}$ may be that contributed by the salt supplying the ligand in forming the anionic material or it may be supplied by the zeolite itself. Alternatively, the cation with which the anionic material is paired in the zeolite may be substituted with another cation which binds more strongly thereto for the purpose of tailoring the complex to suit a particular intended application. For example, if the anionic material is paired within the zeolite with sodium as a result of the ligand having been supplied by a sodium salt thereof, the sodium may be replaced in whole or in part with, for example, Mg, to form a material having different properties.

The materials of the present invention have applications for binding small molecules for use as absorbents in gas separation and enrichment procedures. The materials can be incorporated into membranes or pressure swing devices to achieve separation or enrichment. The cyano (Co(II) complexes are important in this regard in that it has been demonstrated that they exhibit reversible binding of $O_2$. Approximately 400 cycles of adsorption and desorption of $O_2$ were carried out using the sample prepared in Example 4 below with no evidence of decomposition. This system exhibits a very unique stability for a synthetic oxygen carrier. The $O_2$ is very strongly bound, with only about one-third of it being removed at $10^{-2}$ torr on some samples. Thus, the material may be used to absorb oxygen from solutions. For example, the deoxygenated form in a sealed capsule could be broken into a solution and absorb dissolved oxygen and could be filtered off to produce an $O_2$ free solution. The affinity of the doped zeolite for $O_2$ can be varied as evidenced by the ease of $O_2$ removal by vacuum. This can be achieved by several means, including (1) varying the cation in the ion pair, (2) varying the solvent used for preparation of the material, or (3) varying the $CN^-$ to cobalt ratio in the zeolite. Tests also indicate that this material is stable to $\sim 200°$ C., suggesting utilization in a temperature swing or pressure temperature swing device.

These materials also have application in the area of catalysis. Isolation of coordinatively unsaturated anionic species may be achieved and these species are known to be catalytically active in solution. Trapping such materials in a zeolite will enhance their stability for they are too reactive to exist for very long at high concentrations in solution.

Suitable metals, M, for preparing the compositions of the invention include any of the transition metal series of the periodic chart of elements which forms a stable anionic complex with L.

Suitable ligands, L, for preparing the compositions of the invention include any which forms a stable anionic complex with M and binds more strongly to M than does the oxide surfaces of the zeolite, e.g., $CN^-$, $H^-$, $SH^-$, $S^{2-}$, etc.

The invention is illustrated by the following non-limiting examples:

EXAMPLE 1

In a 250 ml Erlenmeyer flask was placed 22.54 g NaA zeolite and 125 ml of an aqueous solution containing 14.29 g of $CoCl_2 \times 6H_2O$. The mixture was heated at 70° C. with stirring for 20 hours. After filtration, the CoNaA zeolite was rinsed with demineralized water to remove chloride ion. The resulting CoNaA zeolite was dried under vacuum at 160° C. for $\sim 12$ hours; the Co content was $1.9 \times 10^{-3}$ M/1 g zeolite.

In a 100 ml three-necked round bottom flask equipped with a dropping funnel containing concentrated hydrochloric acid and a glass column packed with 2 g of the above-prepared CoNaA zeolite was placed 8 g of potassium cyanide. Dropwise addition of hydrochloric acid into the flask generated hydrogen cyanide, which was dried over $CaSO_4$. Using a nitrogen stream (3 ml/min), hydrogen cyanide was passed through the zeolite until a color change (from violet to blue) was observed. The solid was purged with nitrogen.

Elemental analysis showed: % C=0.90, % H=2.02, % N=0.88.

EXAMPLE 2

In a 200 ml Erlenmeyer flask equipped with a septum was placed 2.3 g CoNaA zeolite (prepared by the method of Example 1), 3.85 g sodium cyanide and 150 ml methanol (dried over 3 Å molecular sieves). The mixture was stirred at room temperature for 188 hours, then filtered, washed with methanol to remove excess cyanide and dried under vacuum at room temperature for $\sim 12$ hours.

Elemental analysis showed: % C=2.85, % H=1.51, % N=2.49.

EXAMPLE 3

In a 250 ml Erlenmeyer flask was placed 12.5 g NaY zeolite, and 180 ml aqueous solution containing 17.84 g of $CoCl_2 \times 6 H_2O$. The mixture was stirred at room temperature for 16 hours, then filtered. The CoNaY zeolite was washed with demineralized water to remove chloride and dried at 160° C. under vacuum for $\sim 12$ hours; the Co content was $2 \times 10^{-3}$ M/1 g.

In a 200 ml Erlenmeyer flask equipped with septum was placed 2 g of the above-prepared CoNaY zeolite, 0.534 g sodium cyanide and 150 ml methanol (dried over 3 Å molecular sieves). The slurry was stirred at room temperature for 18 hours, filtered and the zeolite was rinsed with methanol to remove excess cyanide. The solid was dried at room temperature under vacuum for $\sim 12$ hours.

Elemental analysis showed: % C=1.50, % H=2.22, % N=1.15.

EXAMPLE 4

In a 500 ml Erlenmeyer flask was placed 35 g NaY zeolite and 250 ml-0.4 M aqueous solution of $CoCl_2$ $5 \times 6H_2O$. The mixture was stirred at 70° C. for 24 hours, cooled to room temperature and filtered. The CoNaY zeolite was washed with deionized water to remove chloride, then dried at 200° C. under vacuum for $\sim 12$ hours; the Co content was $8.5 \times 10^{-4}$ M/1 g.

The procedure of the second part of Example 3 was repeated using 2.2 g of the above prepared CoNaY zeolite, 2.2 g sodium cyanide and 150 ml methanol. The slurry was stirred for 96 hours.

Elemental analysis showed: % C=5.67, % H=1.12, % N=5.64.

EXAMPLE 5

In a 250 ml Erlenmeyer flask equipped with septum was placed 2.2 g CoNaY zeolite (preparation was described in Example 4), 2.3 g sodium cyanide and 150 ml demineralized water. The slurry was stirred at room temperature for 120 hours, then filtered, washed with deionized water to remove excess cyanide and dried at room temperature under vacuum for $\sim 12$ hours.

Elemental analysis showed: % C=1.40, % H=2.06, % N=1.25.

EXAMPLE 6

In a 250 ml Erlenmeyer flask equipped with septum was placed 2 g of CoNaY zeolite (prepared as described in Example 4), 2.2 g of sodium cyanide and 150 ml N,N-dimethyl formamide (dried over 3 Å molecular sieves). The mixture was stirred at room temperature for 237 hours, filtered and washed with N,N-dimethyl formamide to remove excess cyanide. The solid was dried at room temperature under vacuum for ~12 hours.

Elemental analysis showed: % C=9.22, % H=1.63, % N=5.88.

EXAMPLE 7

The method outlined in Example 4 was repeated utilizing the zeolite composition thereof and stirring 2.3 g CoNaY zeolite, 2.0 g potassium cyanide and 120 ml methanol for 120 hours.

Elemental analysis showed: % C=3.68, % H=0.97, % N=3.98.

EXAMPLE 8

The method of Example 6 was repeated utilizing the zeolite composition thereof. The mixture 2.1 g CoNaY zeolite and 100 ml 0.5 M solution of lithium cyanide in N,N-dimethyl formamide was stirred at room temperature for 237 hours.

Elemental analysis showed: % C=7.43, % H=2.34, % N=3.04.

EXAMPLE 9

In a 250 ml Erlenmeyer flask was placed 6.84 g NaY zeolite (dried at 170° C. under vacuum) and 100 ml 0.253 M aqueous solution of lithium chloride. The mixture was stirred at room temperature for 6 hours and then filtered.

The exchange process with lithium chloride was repeated twice, using 100 ml 0.253 M solution each time. The product was filtered, washed with deionized water until chloride ion was removed and dried under vacuum for ~12 hours.

In a 250 ml Erlenmeyer flask was placed 3.94 g of the above prepared LiNaY zeolite and 150 ml 0.4 M aqueous solution of cobaltous chloride. The mixture was stirred at room temperature for 4 hours, then filtered and washed with demineralized water until chloride was removed. The CoLiNaY zeolite was dried at 160° C. under vacuum for ~12 hours.

The method of the second part of Example 3 was repeated utilizing 2 g of the above prepared LiCoNaY zeolite, 8 g sodium cyanide and 100 ml of methanol. The mixture was stirred at room temperature for 127 hours.

Elemental analysis showed: % C=3.98, % H=1.1, % N=3.96.

EXAMPLE 10

The method of Example 9 was repeated utilizing potassium chloride.

In a 250 ml Erlenmeyer flask was placed 6.92 g NaY zeolite and 100 ml aqueous solution containing 1.88 g of potassium chloride. The mixture was stirred at room temperature for 6 hours, then filtered. The exchange process described above was repeated twice utilizing 100 ml solution containing 1.88 g of potassium chloride each time.

The mixture was filtered, washed and the KNaY zeolite was dried at 170° C. under vacuum for ~30 hours.

In a 250 ml Erlenmeyer flask was placed 5 g of the above prepared KNaY zeolite and 150 ml 0.28 M aqueous solution of $CoCl_2$. The mixture was stirred at room temperature for 48 hours. The slurry was filtered, washed and dried.

In a 200 ml Erlenmeyer flask equipped with septum was placed 2 g of the above prepared CoKNaY zeolite, 8 g sodium cyanide and 100 ml methanol. The mixture was allowed to stir for 127 hours, then filtered, washed and dried.

Elemental analysis showed: % C=3.46, % H=1.45, % N=3.60.

EXAMPLE 11

The method of Example 9 was repeated utilizing cesium chloride.

The mixture of 8.5 g NaY zeolite in 150 ml aqueous solution containing 4.12 g of cesium chloride was stirred at room temperature for 48 hours, then filtered and washed with demineralized water to remove chloride ion. After washing 200 ml of 0.28 M aqueous solution of cobaltous chloride was added and the slurry was stirred at room temperature for 48 hours, then filtered, washed and dried.

A mixture containing 2 g of the above prepared CoCsNaY zeolite, 8 g sodium cyanide and 100 ml methanol was stirred for 127 hours.

Elemental analysis showed: % C=3.62, % H=0.92, % N=3.56.

EXAMPLE 12

In a 250 ml Erlenmeyer flask was placed 6 g NaY zeolite and 150 ml aqueous solution contianing 7.46 g hydrated ferrous chloride. The mixture was stirred at room temperature for 22 hours, then filtered and washed with deionized water to remove chloride and dried at 160° C. under vacuum for ~12 hours; the Fe content was $1.1 \times 10^{-3}$ M/1 g.

In a 200 ml Erlenmeyer flask equipped with septum was placed 1.5 g of the above prepared zeolite, 1.5 g sodium cyanide and 100 ml methanol (dried over 3 Å molecular sieves). The mixture was stirred at room temperature for 70 hours, then filtered, washed with methanol to remove excess cyanide and dried at room temperature under vacuum for ~12 hours.

Elemental analysis showed: % C=1.02, % H=1.65, % N=0.50.

EXAMPLE 13

The method of Example 12 was repeated utilizing ferric chloride in place of ferrous chloride. A mixture containing 5 g of NaY zeolite, 3.5 g of ferric chloride and 200 ml deionized water was stirred for 12 hours, then filtered, washed and dried; the Fe content was $1.1 \times 10^{-3}$ M/1 g.

A mixture containing 2 g of the above prepared $Fe^{III}$-NaY zeolite, 5 g sodium cyanide and 100 ml methanol was stirred for 120 hours.

Elemental analysis showed: % C=1.17, % H 1.45, % N=0.84.

EXAMPLE 14

In a 250 ml Erlenmeyer flask was placed 6 g NaY zeolite, 4.2 g cupric chloride and 125 ml deionized water. The mixture was heated to 70° C. with stirring for 12 hours, then filtered.

The exchange process was repeated using of 4.2 g cupric chloride in 125 ml deionized water. The mixture was filtered, zeolite CuNaY was washed with demineralized water and dried at 160° C. under vacuum for 12 hours; the Cu content was $8 \times 10^{-4}$ M/1 g.

In a 200 ml Erlenmeyer flask equipped with septum was placed 1.5 g of CuNaY, zeolite 3 g sodium cyanide and 100 ml methanol (dried over 3 Å molecular sieves). The mixture was stirred at room temperature for 120 hours, then filtered, washed with methanol and dried at 160° C. under vacuum for ~12 hours.

Elemental analysis showed: % C=2.49, % H=1.66, % N=2.20.

EXAMPLE 15

In a 250 ml Erlenmeyer flask was placed 4 g NaY zeolite and 100 ml of an aqueous solution containing 10 g hydrated manganous chloride. The mixture was stirred at 70° C. for 24 hours, then filtered and zeolite MnNaY was washed with deionized water to remove chloride and dried at 160° C. under vacuum for 30 hours, the Mn content was $1.3 \times 10^{-3}$ M/1 g.

The method of Example 3 was repeated utilizing 2 g of the above prepared zeolite and 5.2 g sodium cyanide in 100 ml methanol. The mixture was stirred for 192 hours.

Elemental analysis showed: % C=3.16, % H=1.52, % N=2.88.

EXAMPLE 16

In a 250 Erlenmeyer flask was placed 5 g NaY zeolite and 200 ml aqueous solution containing 2.03 g $NiCl_2 \times 6H_2O$. The slurry was stirred at room temperature for 8 hours, then filtered and washed with deionized water to remove chloride ion. The NiNaY zeolite was dried at 160° C. under vacuum for ~12 hours.

The method of Example 3 was repeated utilizing 2 g of the above prepared zeolite, 5.28 g sodium cyanide and 100 ml methanol. The mixture was stirred for 126 hours.

Elemental analysis showed: % C=2.65, % H=1.96, % N=2.65.

EXAMPLE 17

In a 250 ml Erlenmeyer flask was placed 2.5 g NiNaY Zeolite (prepared as in Example 16) and 100 ml $3.5 \times 10^{-3}$ M aqueous solution of cobaltous chloride. The slurry was stirred at room temperature for 5 hours, then filtered, washed with demineralized water to remove chloride and dried at 160° C. under vacuum for ~12 hours.

The method of Example 2 was used, utilizing 2 g of the above prepared zeolite, 5 g sodium cyanide and 100 ml methanol. The sample was stirred for 126 hours.

Elemental analysis showed: % C=2.99, % H=1.66, % N=3.02.

EXAMPLE 18

In a 250 ml Erlenmeyer flask was placed 12 g NaX zeolite and 200 ml 0.4 M aqueous solution cobaltous chloride. The mixture was stirred at 80° C. for 4 hours, then filtered, washed with demineralized water to remove chloride and dried at 160° C. under vacuum for ~12 hours.

The method in the last step of Example 2 was used, utilizing 2.4 g of the above prepared zeolite and 8.94 g sodium cyanide in 150 ml of methanol. The slurry was stirred for 120 hours.

Elemental analysis showed: % C=2.05, % H=1.20, % N=1.85.

EXAMPLE 19

The material of Example 2 was placed in a quartz tube and connected to a high vacuum line. EPR studies showed the presence of an $O_2$ adduct $Co(CN)_n{}^{n-2} O_2$. After subjecting the sample to high vacuum EPR results showed that most of the $O_2$ was removed and the EPR spectrum of $Co(CN)_n{}^{n-2}$ was obtained.

EXAMPLE 20

The material of Example 4 was placed in a quartz tube and connected top a mechanical vacuum pump. EPR results indicated that about 30% of the $O_2$ was removed following pumping on the sample a few minutes; however, introducing $O_2$ led to the fully oxygenated material. This cycling procedure was repeated 400 times with no apparent decomposition.

EXAMPLE 21

The material of Example 4 was subjected to a vacuum from a mechanical pump. EPR results showed a greatly diminished signal in comparison to Example 20, indicating $O_2$ could be removed more easily.

EXAMPLE 22

The material of Example 4 was placed in a quartz tube and heated to 215° C. Upon subjecting the sample to a vacuum from a mechanical pump, more extensive removal of $O_2$ occurred. The material was reversibly cycled, indicating thermal stability of the system.

The zeolite is preferably reacted with the metal M, ions in a metal derivative form. Although any metal derivative, the metal ions of which can be exchanged for the ions of metal, M, may be employed, it is preferred to use alkali metal (i.e., sodium, potassium, lithium, cesium) derivatives since they are readily available and the alkali metal ions are easily exchanged with the ions of metal, M.

The ligand may be utilized in any form in which it readily reacts with the ions of metal, M, e.g., in gaseous form, in solution, etc.

EXAMPLE 23

In a 1000 ml Erlenmeyer flask was placed 8 g CoNaY zeolite (prepared as in Example 4), 16 g sodium cyanide and 400 ml methanol. The slurry was stirred for 98 hours at room temperature, then filtered, rinsed with methanol and dried at room temperature under vacuum for ~12 hours.

Elemental analysis showed: % C=4.02, % H=0.97, % N=4.21.

EXAMPLE 24

In a 100 ml flask was placed 1 g of zeolite containing $Co(CN)_n{}^{n-2}$ (prepared as described in Example 23), 1.5 g magnesium chloride and 50 ml deionized water. The mixture was stirred for 18 hours at room temperature then washed with deionized water and dried under vacuum for ~12 hours.

EXAMPLE 25

The material of Example 23 was transferred to a quartz tube and connected to a high vacuum line. EPR studies showed the presence of an $Co(CN)_n{}^{n-2}$ —$O_2$ adduct. After subjecting the sample to high vacuum and heating at 80° C. the $Co(CN)_n{}^{n-2}$ spectrum was obtained. Introduction of oxygen led to the fully oxygenated material which easily released oxygen (~98%) by pumping under vacuum at room temperature.

EXAMPLE 26

The material of Example 24 was placed in a quartz tube and connected to a vacuum line. EPR studies showed the influence of magnesium ion treatment on $Co(CN)_n{}^{n-2}$—$O_2$ adduct. After degassing the sample at room temperature the $CoO_2$ signal disappeared. Exposure of this sample to oxygen led to an oxygenated sample whose EPR spectrum was quite complex. Pumping at room temperature removed about 30% of the oxygen. Heating at 80° C. following pumping led to removal of the $Co(CN)_n{}^{n-2}$ hyperfine structure in the EPR spectrum. An EPR spectrum characteristic of the $Co(CN)_n{}^{n-2}$—$O_2$ adduct but containing additional signals was obtained after readsorption of oxygen.

We claim:

1. A composition consisting essentially of a crystalline aluminosilicate zeolite having a three-dimensional, porous network structure containing small cavities inter-connected by interstitial channels, said structure having entrapped therein as an ion pair an anionic material having the formula, $ML_n{}^{-n+m}$, wherein M is a metal, L is an anionic ligand, which coordinates more strongly to M than to the surface of said zeolite, n is the number of ligands bound to the metal ion and is an integer from 1 to 6, and m is the oxidation state of the metal.

2. The composition of claim 1 wherein said zeolite is selected from the group consisting of type A, type X, type Y and mixtures thereof.

3. The composition of claim 2 wherein said zeolite is a type zeolite.

4. The composition of claim 2 wherein said zeolite is a type X zeolite.

5. The composition of claim 2 wherein said zeolite is a type Y zeolite.

6. The composition of claim 1 wherein said metal, M is a transition metal.

7. The composition of claim 1 wherein said metal, M, is cobalt.

8. The composition of claim 1 wherein said ligand is selected from the group consisting of $CN^-$, $H^-$, $SH^-$, $S^{2-}$.

9. A method of preparing a crystalline aluminosilicate zeolite having a three-dimensional, porous network structure containing small cavities inter-connected by interstitial channels, said structure having entrapped therein as ion pair an anionic material having the formula $ML_n{}^{-n+m}$, wherein M is a metal, L is an anionic ligand, which coordinates more strongly to M than to the surface of said zeolite, n is the number of ligands bound to the metal ion and is an integer from 1 to 6 and m is the oxidation state of M comprising reacting a metal derivative of said zeolite in solution with ions of said metal, M, whereby at least a portion of the metal ions of said metal derivative of said zeolite are exchanged for ions of said metal, M, and subsequently reacting said exchanged ions of metal, M, with said ligands whereby said $ML_n{}^{-n+m}$ is produced and entrapped within said network structure.

10. The method of claim 9 wherein said zeolite is selected from the group consisting of type A, type X, type Y and mixtures thereof.

11. The method of claim 10 wherein said zeolite is a type A zeolite.

12. The method of claim 10 wherein said zeolite is a type X zeolite.

13. The method of claim 10 wherein said zeolite is a type Y zeolite.

14. The method of claim 9 wherein said metal, M, is a transition metal.

15. The method of claim 9 wherein said metal, M is cobalt.

16. The method of claim 9 wherein said ligand is selected from the group consisting of $CN^-$, $S^{2-}$, $SH^-$ and $H^-$.

17. The method of claim 9 wherein said ligand is CN and is reacted with said zeolite containing exchanged M ions as hydrogen cyanide.

18. The method of claim 9 wherein said ligand is CN and is reacted with said zeolite containing exchanged M ions as cyanide ions in solution.

* * * * *

UNITED STATES PATENT AND TRADEMARK OFFICE
CERTIFICATE OF CORRECTION

PATENT NO. : 4,830,999

DATED : May 16, 1989

INVENTOR(S) : Russell S. Drago; Iwona Bresinska

It is certified that error appears in the above-identified patent and that said Letters Patent is hereby corrected as shown below:

Claim 3, column 9, line 28, should read as follows:

--a type A zeolite.--

Signed and Sealed this

Sixteenth Day of January, 1990

Attest:

JEFFREY M. SAMUELS

Attesting Officer

Acting Commissioner of Patents and Trademarks

UNITED STATES PATENT AND TRADEMARK OFFICE
CERTIFICATE OF CORRECTION

PATENT NO. : 4,830,999
DATED : May 16, 1989
INVENTOR(S) : Russell S. DRAGO, ET AL It is certified that error appears in the above-identified patent and that said Letters Patent is hereby corrected as shown below:

In Column 1, under the title of the invention, please add the following:

-- Research leading to the completion and reduction to practice of the invention was supported, in part, by Grant No. 8408145 issued by the National Science Foundation (NSF). The United States Government has certain rights in and to the claimed invention. --

Signed and Sealed this

Sixteenth Day of November, 1993

Attest:

BRUCE LEHMAN

Attesting Officer

Commissioner of Patents and Trademarks